US 9,946,271 B2

(12) United States Patent
Tuineag et al.

(10) Patent No.: US 9,946,271 B2
(45) Date of Patent: Apr. 17, 2018

(54) FLUID FLOW CONTROL SYSTEM AND DEVICE

(71) Applicants: Stefan Tuineag, Lomita, CA (US); Steven William Walton, Bell Canyon, CA (US)

(72) Inventors: Stefan Tuineag, Lomita, CA (US); Steven William Walton, Bell Canyon, CA (US)

( * ) Notice: Subject to any disclaimer, the term of this patent is extended or adjusted under 35 U.S.C. 154(b) by 9 days.

(21) Appl. No.: 15/168,795

(22) Filed: May 31, 2016

(65) Prior Publication Data
US 2017/0344031 A1    Nov. 30, 2017

(51) Int. Cl.
*G05D 7/06*    (2006.01)
*F16K 31/02*   (2006.01)

(52) U.S. Cl.
CPC .......... *G05D 7/0635* (2013.01); *F16K 31/02* (2013.01)

(58) Field of Classification Search
CPC ............................. G05D 7/0635; F16K 31/02
USPC ................................................. 251/206–209
See application file for complete search history.

(56) References Cited

U.S. PATENT DOCUMENTS

| | | |
|---|---|---|
| 3,007,648 A | 11/1961 | Fraser |
| 3,836,083 A | 9/1974 | Bell |
| 3,999,714 A | 12/1976 | Lang |
| 4,133,350 A | 1/1979 | Nelson |
| 4,191,332 A | 3/1980 | De Langis et al. |
| 4,522,232 A | 6/1985 | Ferguson |
| 4,667,349 A | 5/1987 | Son |
| 5,123,628 A | 6/1992 | Yu |
| 5,139,044 A | 8/1992 | Otten et al. |
| 5,152,465 A | 10/1992 | Calabro |
| 5,408,709 A | 4/1995 | Lockwood |
| 6,016,836 A | 1/2000 | Brunkhardt |
| 6,565,018 B1 | 5/2003 | Degeyter |
| 6,568,425 B2 | 5/2003 | Gergek |
| 6,647,983 B2 * | 11/2003 | Smith et al. ........ A61M 16/204 128/205.11 |
| 6,695,281 B2 | 2/2004 | Williams, Jr. |
| 7,229,031 B2 | 6/2007 | Schmidt |
| 7,503,345 B2 | 3/2009 | Paterson et al. |
| 7,854,399 B2 | 12/2010 | Sirkin |

(Continued)

FOREIGN PATENT DOCUMENTS

WO     2006042053     4/2006

OTHER PUBLICATIONS

Evadrop Smart Water; EvaDrop; website; May 30, 2015; 3 pages; Santa Ana, CA; htts://evadrop.com/.
Iddo Genuth; Air in Shower Can Save 35% of Your Water Consumption; Internet article; Nov. 16, 2013; 2 pages; The Future of Things; http://thefutureofthings.com/5143-air-in-shower-can-save-35-of-your-water-consumption/.

(Continued)

*Primary Examiner* — Kevin Lee
(74) *Attorney, Agent, or Firm* — Anooj Patel; Kevin Schraven; Hankin Patent Law, APC

(57) ABSTRACT

A device and system for regulating the flow of a fluid, comprising: a fluid flow controller; wherein the fluid flow controller comprises: a fluid flow control component and an electronic controller; wherein the fluid flow control component is configured to allow at least two different flow rates of a fluid to pass through the fluid flow controller; and wherein the electronic controller controls the fluid flow controller component, such that the fluid flow controller component operatively switches between the at least two different flow rates.

14 Claims, 10 Drawing Sheets

(56) References Cited

U.S. PATENT DOCUMENTS

| | | |
|---|---|---|
| 7,857,234 B2 | 12/2010 | Daley et al. |
| 7,979,928 B2 | 7/2011 | Allen, Jr. et al. |
| 8,028,935 B2 | 10/2011 | Leber |
| 8,091,587 B1 | 1/2012 | Schwartz |
| 8,132,778 B2 | 3/2012 | Connors |
| 8,313,085 B2 | 11/2012 | Dempsey et al. |
| 8,567,445 B2 | 10/2013 | Schwartz |
| 8,613,607 B2 * | 12/2013 | Darsey ............... F04B 39/0055 251/205 |
| 8,807,521 B2 | 8/2014 | Dunki-Jacobs et al. |
| 8,847,727 B2 | 9/2014 | Shapiro et al. |
| 8,893,320 B2 | 11/2014 | Klicpera |
| 9,049,821 B1 | 6/2015 | Hanna |
| 9,061,294 B2 | 6/2015 | Kajuch et al. |
| 2003/0047327 A1 | 3/2003 | Gilbert |
| 2003/0178070 A1 | 9/2003 | Glicken |
| 2005/0167625 A1 | 8/2005 | Deen |
| 2005/0236594 A1 | 10/2005 | Lilly et al. |
| 2006/0219822 A1 | 10/2006 | Miller et al. |
| 2009/0223579 A1 | 9/2009 | Bautch |
| 2013/0340833 A1 | 12/2013 | Alonazy |
| 2015/0308089 A1 | 10/2015 | Thompson et al. |

OTHER PUBLICATIONS

Mira Showers; Digital Showers; website; Oct. 25, 2011; 2 pages; Kohler Mira, Ltd.; http://www.mirashowers.co.uk/onlinecatalog/results.htm?sectionName=Digital%20showers.

Triton Showers; Digital Showers; on-line brochure; 3 pages; http://www.tritonshowers.co.uk/media/custom/upload/File-1429522871.pdf.

New American Home; DTVPlus; on-line brochure; 36 pages; Kohler Co.; Wisconsin; http://www.newamericanhome2016.com/sites/americanhome/files/000467-1_DTVPlusBrochure.pdf.

Crosswater Bathrooms; website; Mar. 27, 2016; 2 pages; http://www.crosswater.co.uk/designer-collections/digital/elite/.

Bristan; Artisan Evo; website; Feb. 14, 2015; 3 pages; http://www.bristan.com/ArtisanEvo.

Plumbing Supply; Remote Controlled Water Shutoff Systems; website; Aug. 15, 2009; 3 pages; https://www.plumbingsupply.com/remote-controlled-water-shutoff-system.html.

Grohe; Rainshower F-digital; website; Mar. 6, 2014; 4 pages; http://www.grohe.com/my/8518/shower/hand-showers-shower-sets/rainshower-f-digital/.

* cited by examiner

FLUID FLOW CONTROL SYSTEM AND DEVICE

FIELD OF USE

The present disclosure relates generally to systems and devices for reducing water usage, and more specifically, to devices, methods, and systems for monitoring and adjusting water flow rates.

BACKGROUND

As water demands continue to rise, it is clear that efforts at water conservation need to be implemented because the water supply is static and/or diminishing. One of the problems is that the annual supply of drinking water is mostly out of the control of humans, because it comes from rainfall or snowpack runoff.

Additionally, because water is a part of every family's monthly expense, saving water is desirable in order to save money on water bills. Showering amounts to a significant source of indoor water usage. For facilities that have multiple showers, such as, hotels and motels, un-moderated shower use can add up to a significant expense.

Currently, there are numerous products, control valves, and other types of systems on the market to reduce water usage in the shower by restricting the flow of water. However, with many of these systems people notice immediately that the water flow is undesirably low, and they do not appreciate the noticeably poor water pressure. Showers that utilize fixed, restricted water flows are often seen as less comfortable and desirable.

Most water flow restricting devices are not connected or part of a larger computer controlled system, complete with intricate algorithms, which can optimize water conservation. Instead they merely provide sensor readings of the instant water consumption (1 gpm, 2 gpm, etc.).

Therefore, based on the foregoing, there is a need for a device, system, and/or method in which the amount of water used in a shower is decreased while a showering individual does not notice that less water is being used and water usage is able to be monitored. The devices may have interconnectivity with computer based systems in order to apply dynamic water usage changes in real-time, depending on the current usage.

SUMMARY OF EMBODIMENTS

To minimize the limitations in the prior art, the present specification discloses a new and useful device, system, and method for measuring, analyzing and optimizing the water consumption in a facility, particularly facilities with multiple showers. The water control system may use dynamic algorithms to control water flow restriction units to optimize a water outlet in an unobtrusive way.

One embodiment of the water control system may comprise a battery powered hardware device that incorporates two fluid flow channels that have predetermined and assigned pressure independent flow regulators (preferably 1.0 gallons per minute and 1.5 gallons per minute. A rotary device (rheostat), with 3 position, may be used to select the desired flow. For example, the flow can be 1 gpm, 1.5 gpm or 2.5 gpm. By selecting one of the three different flows the system may easily determine the instantaneous water consumption (in gallons per minute), the time spent in shower (in minutes), and the system may adjust the water consumption during a shower event by moving the rheostat. The water flow controller may interact (through Wi-Fi/Bluetooth®) with a controlling system, such as a computing device, server, or cloud based server. In one embodiment, the device portion of the system may be a DC 3V motor, with gearhead, which is used to select one of the three flow channels by rotating a blocking disk to cover one of the two channels or none of the two channels. Preferably, the motor may have an absolute feedback position sensor (halo effect, trimmer resistor, optic, etc.) that allows the system to precisely select the required flow setting. The motor may be controlled by a Wi-Fi/Bluetooth® microcontroller. The flow in the system may be pressure compensated, which means that the flow does not vary with the pressure in the system. The inlet and outlet may be ½ NPT or G ½" (which is standard for showers/shower arms). The water flow control device may be controlled via an application running on a computing device, including a smartphone, a server, or a cloud based server. Preferably, the device does not include a flow meter or flow sensor, which saves battery power. The flow channels are set within the device, so there is no need to measure the flow rate, the system only needs to select which flow channel(s) is/are used.

One embodiment of the water control system may comprise an intelligent self-learning/self-tuning algorithm that calculates/transmits (through Wi-Fi/Bluetooth®) the optimal solution for water consumption to each water outlet on the system. The system may require a water consumption target (defined by the facility management) for the entire facility (hotel, hospital, etc.). The system, based on data received from the water control device installed on the outlets will create profiles/behaviors for the water consumption average water consumption per user, time spent in the shower, seasonal water consumption, and other factors. Based on these profiles and the water target consumption provided by management, the algorithm may find the best solution to optimize water consumption without interfering (or with the minimal interference possible) with the end user. Preferably, the end user does not have access to the flow regulating system or device. Preferably, the user does not know what the flow rate is for the outlet being used. The flow rate(s) are decided by the self-tuning/dynamic algorithm(s), which are on servers or cloud servers.

One embodiment of the fluid flow controller device, may comprise: a fluid flow controller; wherein the fluid flow controller comprises: a fluid flow control component and an electronic controller; wherein the fluid flow control component may be configured to allow a fluid to flow at least two different flow rates through the fluid flow controller; and wherein the electronic controller controls the fluid flow controller component, such that the fluid flow controller component operatively switches between the at least two different flow rates. The electronic controller may be configured to wirelessly connect to an external computing device. The electronic controller may receive one or more signals from the external computing device related to selecting one of the at least two different flow rates. The fluid flow controller may further comprise a powered drive unit; wherein the powered drive unit may be operatively coupled with the fluid flow control component and the electronic controller; and wherein the electronic controller sends a signal to the powered drive unit, which in turn may actuate the fluid flow control component. The electronic controller may receive one or more signals from the external computing unit related to selecting one of the at least two different flow rates. The at least two different flow rates may be three different flow rates. The fluid flow control component may comprise: a mechanical rheostat, a first control adapter, and a second control adapter; wherein the mechanical rheostat may be configured to operatively couple with a drive shaft of the powered drive unit. The mechanical rheostat may have three positions: blocking the first control adapter; blocking the second control adapter; and not blocking either the first control adapter or the second control adapter. Preferably, depending on which position the mechanical rheostat is in, the fluid flow controller allows the fluid to flow through the fluid flow controller in one of the three different flow rates. The fluid flow controller may further comprise one or more hall sensors; wherein the one or more hall sensors may be configured to determine a rotational position of the motor shaft. The fluid flow controller may further comprise at least one pressure switch; wherein the at least one pressure switch may be configured to determine whether the fluid is flowing through the fluid flow controller. A rotational position data from the one or more hall sensors and a flow data from the at least one pressure switch may be communicated to the electronic controller. The electronic controller may communicate the rotational position data from the one or more hall sensors and the flow data from the at least one pressure switch to the external computing unit. The three different flow rates may be: 1.5 gallon per minute, 1 gallons per minute, and 2.5 gallons per minute.

In a preferred embodiment, the device has only one pressure switch, which is connected to the main power supply, which may be the batteries. When water is not flowing through the device, all the electronic components of the device are not connected to the batteries. When the water is turned on the pressure switch is activated and the electronic controller and all of the electronic components thereof are connected to the batteries and are brought on-line. The electronic controller is then able to function, optimize water usage, and record water usage.

In another embodiment the fluid flow control system may comprise: a fluid flow controller; and an external computing device. The fluid flow controller may comprise: a fluid flow control component and an electronic controller. The fluid flow control component may be configured to allow at least two different flow rates of a fluid to pass through the fluid flow controller. The electronic controller may control the fluid flow controller component, such that the fluid flow controller component operatively switches between the at least two different flow rates. The electronic controller may be configured to wirelessly connect to the external computing unit; wherein the electronic controller is configured to receive one or more signals from the external computing unit related to selecting one of the at least two different flow rates. The fluid flow controller may further comprise a powered drive unit; wherein the powered drive unit may be operatively coupled with the fluid flow control component and the electronic controller; and wherein the electronic controller sends a signal to the powered drive unit, which in turn actuates the fluid flow control component. The electronic controller may receive one or more signals from the external computing unit related to selecting one of the at least two different flow rates. The at least two different flow rates may be three different flow rates. The fluid flow control component may comprise: a mechanical rheostat, a first control adapter, and a second control adapter; wherein the mechanical rheostat may be configured to operatively couple with a drive shaft of the powered drive unit; wherein the mechanical rheostat has three positions: blocking the first control adapter; blocking the second control adapter; and not blocking either the first control adapter or the second control adapter. Preferably, depending on which position the mechanical rheostat is in, the fluid flow controller may allow the fluid to flow through the fluid flow controller in one of the three different flow rates. The fluid flow controller further comprises one or more hall sensors and at least one pressure switch; wherein the one or more hall sensors are configured to determine a rotational position of the motor shaft; wherein the at least one pressure switch may be configured to determine whether the fluid is flowing through the fluid flow controller; wherein a rotational position data from the one or more hall sensors and a flow data from the at least one pressure switch may be communicated to the electronic controller. The electronic controller may communicate the rotational position data from the one or more hall sensors and the flow data from the at least one pressure switch to the external computing unit. The three different flow rates may be: 1.5 gallon per minute, 1 gallons per minute, and 2.5 gallons per minute. The computing device may comprise an application, wherein the application receives and records a use data from the fluid flow controller. The application may use the use data to prepare one or more fluid use profiles. The application may be configured to send commands to the fluid flow controller to adjust the flow of fluid through the fluid flow controller based on the one or more fluid use profiles. Preferably, when the application determines that a set amount of the fluid has passed through the fluid flow controller, the application may send a signal to the fluid flow controller to lower the flow rate of the fluid passing through the fluid flow controller. Preferably, when the application determines that the fluid has flowed through the fluid flow controller for a set amount of time, the application sends a signal to the fluid flow controller to lower the flow rate of the fluid passing through the fluid flow controller.

It is an object to overcome the deficiencies of the prior art.

These, as well as other components, steps, features, objects, benefits, and advantages, will now become clear from a review of the following detailed description of illustrative embodiments, of the accompanying drawings, and of the claims.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

Figure 1:
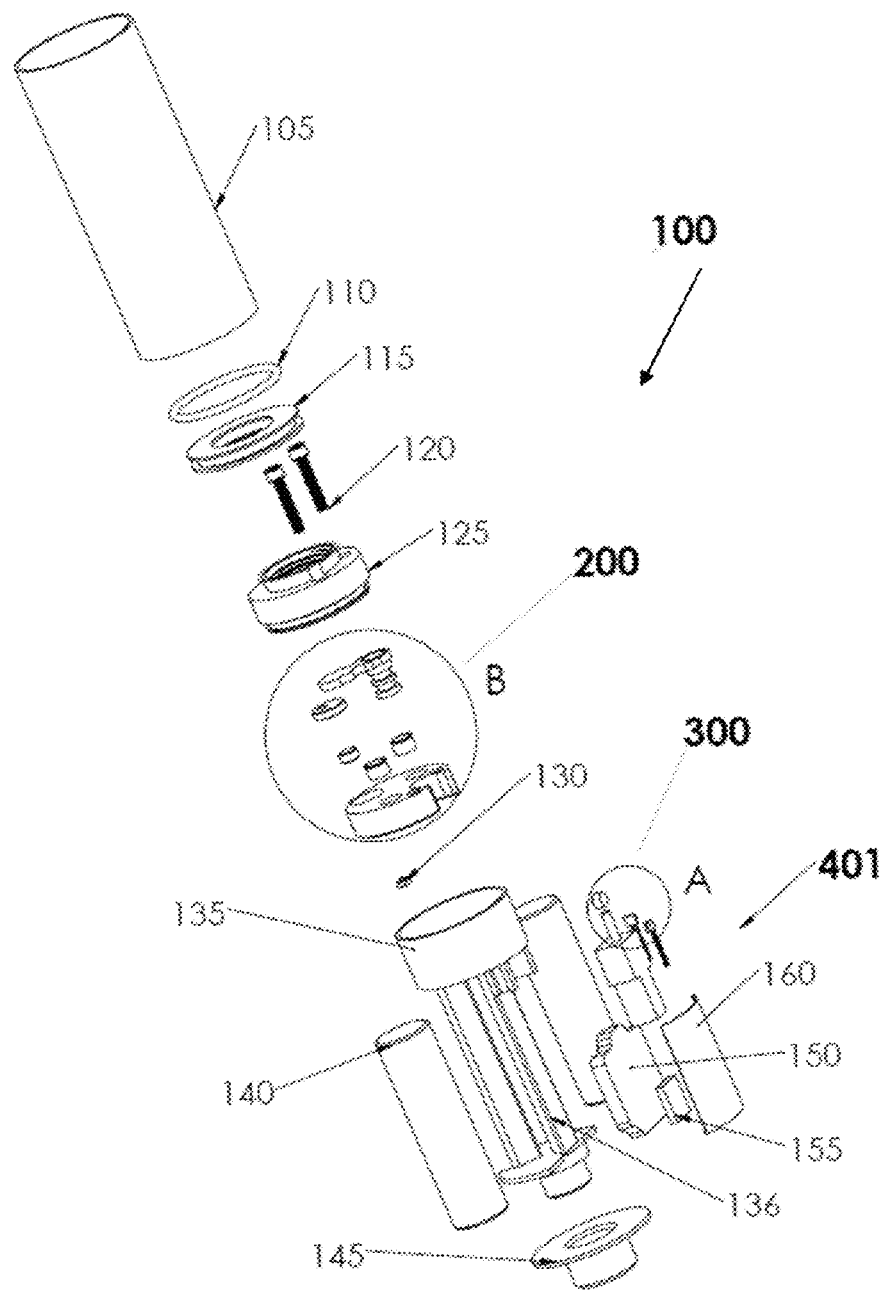
FIG. 1 is an illustration of an exploded view of one embodiment of a fluid flow controller.

In the following detailed description, numerous specific details are set forth in order to provide a thorough understanding of various aspects of one or more embodiments. However, the one or more embodiments may be practiced without some or all of these specific details. In other instances, well-known procedures and/or components have not been described in detail so as not to unnecessarily obscure aspects of the embodiments.

While some embodiments are disclosed herein, still other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For example, as used herein, the terms "computer", "computing device", or "computer system" refer to any device or machine that processes data or information with an integrated circuit chip, including without limitation, personal computers, mainframe computers, workstations, testing equipment, servers, desktop computers, portable computers, laptop computers, embedded computers, wireless devices including cellular phones, personal digital assistants, tablets, tablet computers, smartphones, portable game players, and hand-held computers. Computing devices may also include mobile computing devices such as smartphones, tablets, wearables, and the like. The mobile computing device may also be a feedback application enabled mobile computing device, which is preferably a mobile computing device configured with a feedback application running by a processor of the mobile computing device.

The terms "application", "software", "software application", or "feedback application" generally refer to any set of machine-readable instructions on a client machine, web interface, and/or computer system, that directs a computer's processor to perform specific steps, processes, or operations disclosed herein. The "application", "software", "software application", and "feedback application" may comprise one or more modules that direct the operation of the computing device or computer system on how to perform the method for providing and analyzing feedback and reviews. For purposes of this specification, a module may be implemented as a hardware circuit comprising custom VLSI circuits or gate arrays, off-the-shelf semiconductors such as logic chips, transistors, or other discrete components. A module may also be implemented in programmable hardware devices such as field programmable arrays, programmable array logic, programmable logic devices, and the like. Modules may also be implemented in software for execution by various types of processors. An identified module of executable code may, for instance, comprise one or more physical or logical blocks of computer instructions, which may, for instance, be organized as an object procedure, or function. Nevertheless, the executables of an identified module need not be physically located together, but may comprise disparate instructions stored in different locations, which when joined logically together, may comprise the module and achieve the stated purpose for the module.

As used herein, the term "interface device" refers to a mouse, touchpad, touchscreen, joystick, trackball, keyboard, and the like.

As used herein, the term "computer-readable medium" refers to any device or component used to store data or information. Examples of such include, without limitation, a computer-readable medium device such as floppy disk, magnetic hard disk drive, universal serial bus (USB) thumb drive, and solid state hard disk, memory such as flash memory, random access memory (RAM), memory, read-only memory (ROM), optical disk, magneto-optical disk, and register files of a processor.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

As used herein, the term "fluid flow controller" generally refers to a device that is coupled to a fluid outlet, such as a shower water outlet, and regulates a fluid flow from the outlet by regulating, restricting, removing a restriction, and otherwise optimizing the flow in response to the directions of dynamic algorithms. The term "fluid flow control component" generally refers to the components, portions, and/or parts within a fluid flow controller that, in an optimizing manner, actively regulate, block, and remove a blockage from the path of a flow of water.

FIG. 1 is an illustration of an exploded view of one embodiment of a fluid flow controller. As shown in FIG. 1, the fluid flow controller 100 may comprise a shell 105, O-ring 110, cover 115, screws 120, first adapter 125, fluid flow control component 200, pressure switch 130, main body 135, fluid pathway 136, powered drive unit 401, power source 140, second adapter 145, wireless controller 150, motor drive 155, which may receive signals or commands from controller to pass to the DC motor 165, shield 160, and sensor apparatus 300. In one embodiment, the powered drive unit 401 may comprise the power source 140, motor drive 155, DC motor 165, and motor shaft 166. Although a direct current motor is shown in FIG. 1, the drive unit 401 may be any powered or driving device.

One embodiment of the fluid flow control component 200 is described in further detail below and shown in FIG. 2. One embodiment of the sensor apparatus 300 is described in further detail below and shown in FIG. 3.

The shell 105 may be brass, or other suitable plumbing metal and may be used to house and/or protect the various components of the fluid flow controller 100. The O-ring 110 may be rubber and may be used to create a waterproof seal between the fluid flow controller 100 and a shower water pipe to prevent leaking from the top of the fluid flow controller 100. The screws 120 may be used to affix the first adapter 125 and the fluid flow control component 200 and/or the motor housing 135 to one another. The first adapter 125 may be located near the top of the fluid flow controller 100, and may be configured to releaseably engage, for example by twisting or screwing, a shower water line. In one embodiment, the first adapter 125 may be an inlet, allowing a fluid to flow into the fluid flow controller 100.

The fluid flow control component 200 may be configured to rest or be coupled to a top portion of the body 135. The pressure switch 130 may be located between the flow control component 200 and the body 135, which is also called the motor housing. The fluid flow control component 200 may be configured to select how much fluid flows through the fluid flow controller 100.

The body 135 may be configured to act as a platform to secure and protect various components of the fluid flow controller 100, including the fluid pathway 136, power source 140, second adapter 145, wireless controller 150, motor drive 155, shield 160, DC motor 165, and sensor apparatus 300. The power source 140 may be one or more batteries. The second adapter 145 may be located at the bottom of the body 135, and may act as an outlet for fluid that flows through the fluid flow controller 100. The second adapter 145 may be configured to releaseably engage, for example by twisting or screwing, an outlet, such as a water line or shower head. The ends of the body 105 may have lips or overhangs configured to engage the O-ring 110 and second adapter 145 in order to contain the components of the fluid flow controller 100. The fluid pathway 136 may be configured to receive fluid that has passed through the fluid flow control component 200, such that fluid does not substantially interfere or interact with the power source 140, wireless controller 150, motor drive 155, shield 160, DC motor 165, and sensor apparatus 300. The fluid pathway 136 may preferably release the water into the second adapter 145, for continuing water flow. In one embodiment, the second adapter 145 may be an outlet for the fluid flow controller 100.

The power source 140 may provide electrical power to the wireless controller 150, motor drive 155, DC motor 165, and sensor apparatus 300. The wireless controller 150 may be configured to receive a wireless signal from an external computing device. The wireless signal provides instructions to the electronic controller, which are then communicated to the motor drive 155, which then converts the signal into a signal usable by the DC motor 165, and the DC motor 165 is then actuated pursuant to the usable signal. The DC motor 165 may actuate the fluid flow control component 200 such that several configurations of the fluid flow control component 200 are available based on how the DC motor 165 actuates the fluid flow control component 200. The sensor apparatus 300 may be used to identify the position of the DC motor 165, and by extension, in which configuration the fluid flow control component's 200 is. The shield 160 may be used to protect the electrical components, wireless controller 150, motor drive 155, a DC motor 165, and sensor apparatus 300.

In one embodiment of the fluid flow controller 100, the first adapter 125 may be connected to a water line, and the second adapter 145 may be connected to a shower head. Water may flow into the fluid flow controller 100 through the first adapter 125 and then engage the fluid flow control component 200. After water engages the fluid flow controller 100 through the first adapter 125, the water flow may be adjusted by the fluid flow control component 200. An external computing device may send a signal, which is received by the wireless controller 150, and the signal is then sent to the motor drive 155 to convert the signal into one usable by the DC motor 165 and the DC motor 165 turns clockwise or counterclockwise to adjust the water flow control component 200 to the desired settings. The fluid flow controller 100 may also send signals via the wireless controller 150 such as information regarding the position of the DC motor 165, which can be translated to determine the allowed or desired water flow rate. Additionally, the wireless controller 150 can send a signal to one or more external devices, in order to enable a user to monitor when water is or is not flowing. The electronic controller 150 may receive signals from the pressure switch 130 and may then send a wireless message to an external device indicating that water is flowing or not flowing. The external device that receives the signal from the wireless controller 150 uses the flow no flow information, and other data sent or input by a user, to construct one or more water usage profiles that may then be optimized to reduce overall water use. For example, the external device may have a water use profile linked to the fluid flow controller 100 such that after water flows through the fluid flow controller 100 for a pre-determined amount of time at a certain rate, the external device may send a signal to the wireless controller 150 to instruct the DC motor 165 to move to cause the fluid flow control component 200 to adjust the water flow rate. By doing this, an administrator may be able to ensure that as a person showering spends more time in the shower, the flow of water is gradually decreased such that the person showering does not necessarily notice that they are receiving less water than when the shower began.

Once the water flow has been adjusted by the fluid flow control component 200, the water may travel through the fluid pathway 136 of the body 135. Then, after the water travels through the fluid pathway 136, the water may exit the fluid flow controller 100 through the second adapter 145. In one embodiment, the second adapter 145 may be connected to a shower head, and therefore, the flow of water to the shower head is regulated and controlled by the fluid flow controller 100. One advantage of the fluid flow controller 100 is that it may be connected quickly and easily when the second adapter 145 is connected to a shower head or water outlet, and the fluid flow controller 100 may also be used in-line, and may be used in virtually any pipe used to transfer water.

The DC motor 165 may actuate the fluid flow control component 200 based on commands received from an external device. When directed, the DC motor 165 may cause the fluid flow control component 200 to increase, decrease, and/or otherwise set the flow rate. Additionally, because of the location of the pressure switch 130, the fluid flow controller 100 is capable of determining how long water has been flowing. In one embodiment, the pressure switch 130 may be actuated by flowing fluid.

In a preferred embodiment, when fluid is not flowing through the fluid flow controller 100, the batteries are not connected to and/or providing power to the rest of the electronic components of the fluid flow controller 100. When fluid flows through the fluid flow controller 100 the flowing fluid, usually water, actuates the pressure switch 130, which in turn completes an electronic circuit or otherwise connects the electronic portions or components of the fluid flow controller 100 to the power supply 140. Therefore, in this embodiment, if the fluid flow controller 100 is transmitting a signal or otherwise operational, then the fluid is flowing the fluid flow controller 100. In another embodiment, when fluid is flowing, the pressure on the pressure switch 130 is changed, and when this change is sensed and transmitted to an external computing device, the external computing device can keep track of when water is flowing and when water is not flowing. In one embodiment, when water has been flowing for a set amount of time, the external computing device may instruct the fluid flow controller 100 to decrease the flow of water, thereby utilizing less water per minute as the water continues to flow. The fluid flow controller 100 may be especially advantageous to install in locations where numerous showers are used, such as hotels and motels.

Figure 2:
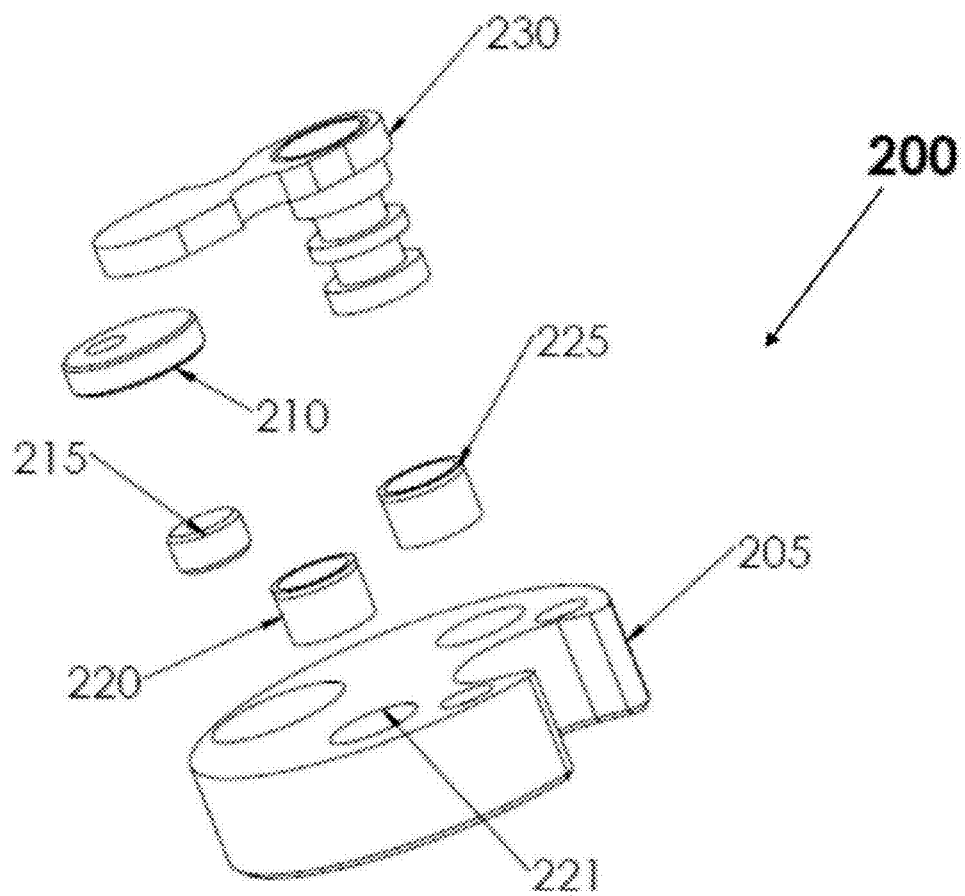
FIG. 2 is an illustration of a close-up exploded view of one embodiment of a fluid flow control component of a fluid flow controller.

FIG. 2 is an illustration of a close-up exploded view of one embodiment of a fluid flow control component of a fluid flow controller. As shown in FIG. 2, the fluid flow control component 200 may comprise a control adapter 205, pressure switch cover 210, pressure switch piston 215, first controller inlet 220, second controller inlet 225, and mechanical rheostat 230. The control adapter 205 may be configured to receive the various components of the fluid flow control component 200. The control adapter 205 may comprise several holes or grooves for receiving the pressure switch piston 215, first controller inlet 220, and second controller inlet 225. The pressure switch piston 215 may be received by a hole or groove in the control adapter 205 and be substantially covered and protected by the pressure switch cover 210, such that, the pressure switch piston 215 is able to determine when water is flowing and when water is not flowing through the fluid flow controller. The first controller 220 may be received by a hole or flow channel that traverses the height of the control adapter 205. Alternatively, a predetermined hole or flow channel 221 in the control adapter 205 may function substantially the same as the first controller 220. The first controller 220 may be configured to allow a first flow rate of water to flow through the flow control component 200. The second controller 225 may be received by a hole or flow channel that traverses the height of the control adapter 205. Alternatively, a predetermined hole or flow channel 226 in the control adapter 205 may function substantially the same as the second controller 225. The second controller 225 may be configured to allow a second flow rate of water to flow through the flow control component 200. The mechanical rheostat 230 may be mounted through the fluid flow control component 200 and be configured to couple with the motor shaft 166, and the DC motor 165 may adjust the position of the motor shaft 166 and therefore, also, the mechanical rheostat 230.

The mechanical rheostat 230 may be configured to impede flow of water through the first controller inlet 220 and/or the second controller inlet 225. When the mechanical rheostat 230 is impeding the flow of water through the first controller inlet 220, any water would flow through the second controller inlet 225, and therefore, the flow of water would be determined by the second flow rate. When the mechanical rheostat 230 is physically regulating, blocking, or otherwise optimizing the flow of water through the second controller inlet 225, any water would flow through the first controller inlet 220, and therefore, the flow of water would be determined by the first flow rate. In the configuration where the mechanical rheostat 230 does not impede the flow of water through either the first controller inlet 220 not the second controller inlet 225, then the water is able to flow through the flow control device according to a third flow rate, which is the sum of the first and second flow rates. In one embodiment, the first flow rate may be 1.0 gallon per minute, the second flow rate may be 1.5 gallons per minute, and the third flow rate may be 2.5 gallons per minute.

The mechanical rheostat 230 may be configured to actuate according to movement of the DC motor 165. Thus, depending on the rotational position of the DC motor 165, the fluid flow control component 200 is able to restrict or optimize the flow of water through the fluid controller device 100.

Figure 3:
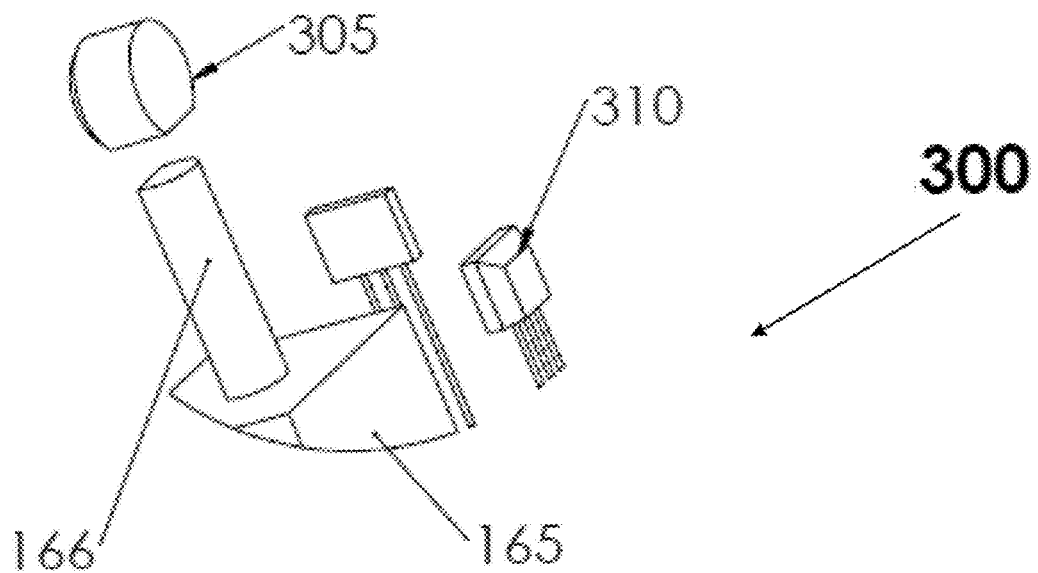
FIG. 3 is an illustration of a close-up exploded view of one embodiment of a sensor of a fluid flow controller.

FIG. 3 is an illustration of a close-up exploded view of one embodiment of a sensor of a fluid flow controller. As shown in FIG. 3, the sensor 300 may comprise a magnet 305, DC motor 165, motor shaft 166, and one or more hall sensors 310. The magnet 305 may be mounted on the motor shaft 166, such that as the DC motor 165 rotates the motor shaft 166, so too does the magnet move. The hall sensors 310 may comprise one or more hall sensors which are mounted in a substantially stationary manner relative to the magnet 305. Thus, as the magnet 305 rotates with the motor shaft 166, the hall sensors 310 are able to determine the location of the magnet 305. By being able to detect the location of the magnet 305, the hall sensors 310 are able to determine the rotational position of the motor shaft 166, and this information may be transmitted wirelessly to an external computing device, from which a user may determine the current configuration of the fluid flow control component 200 and the flow rate of water through the fluid flow controller device 100. The motor shaft 166 is configured to engage with and drive mechanical rheostat 230. In this manner the motor places the mechanical rheostat 230 into one of three different positions.

In another embodiment the rheostat may have fewer or more positions and there may be more than three flow rates involved.

Figure 4:
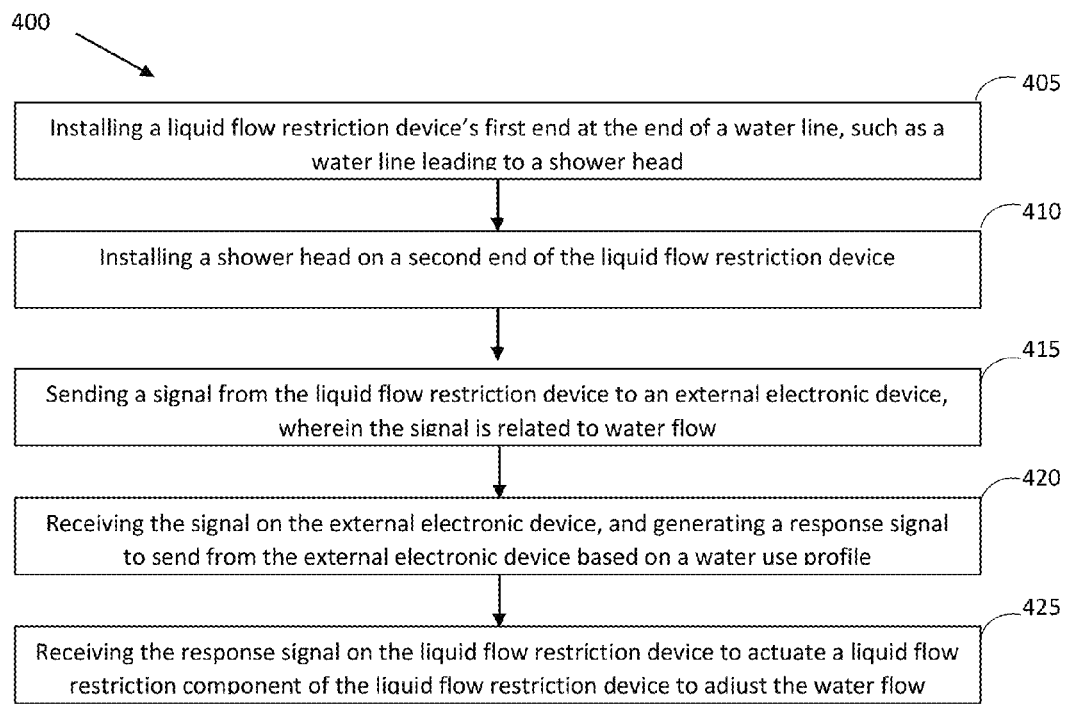
FIG. 4 is a flow chart showing one embodiment of the system for managing and optimizing water flow.

FIG. 4 is a flow chart showing one embodiment of the system for managing and optimizing water flow. As shown in FIG. 4, one embodiment of the system for optimizing water flow may comprise providing a fluid flow control device, preferably fluid flow control device 100, installing a fluid flow control device's first end at the end of a water line, such as a water line leading to a shower head 405, installing a shower head on a second end of the fluid flow control device 410, sending a signal from the fluid flow control device to an external computing device, wherein the signal is related to water flow 415, receiving the signal on the external computing device, and generating a response signal to send from the external computing device based on a water use profile 420 also based on water budgets/multiple water profiles, and receiving the response signal on the fluid flow control device to actuate a fluid flow control component of the fluid flow control device to adjust the water flow 425.

In one embodiment, the external computing device may be connected to, send signals to, and otherwise control multiple fluid flow control devices that have been installed on multiple showers. In other embodiments, the water flow control device may at first provide the highest flow rate (water pressure) available. Then, as the user spends a longer and longer time in the shower, the external computing device and the water flow control device work as a system to gradually reduce the water flow.

Figure 5:
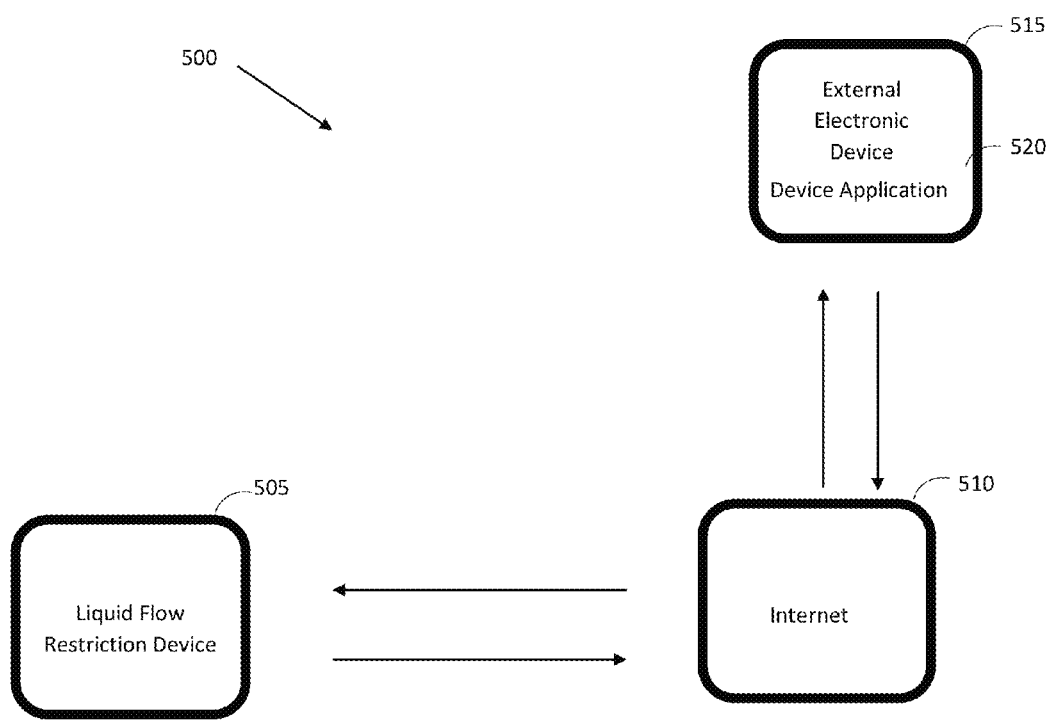
FIG. 5 is a diagram showing one embodiment of the system for optimizing water flow.

FIG. 5 is a diagram showing one embodiment of the system for optimizing water flow. As shown in FIG. 5, the system for optimizing water flow may comprise a fluid flow control device 505, internet 510, external computing device 515, and device application 520. The fluid flow control device 505 may communicate wirelessly through the internet 510 with the external computing device 515. The external computing device 515 may comprise a device application 520. The external computing device 515 may send a signal through the internet 510, to the fluid flow control device 505 to instruct the fluid flow control device 505 to reduce, change, or reset the flow of water passing through the device 505.

The device application 520 may comprise various water usage profiles that are related to numerous fluid flow control devices. The water usage profiles may be pre-loaded, or custom generated by a user. One example of a water usage profile would be a program to decrease the water flow of a particular fluid flow device after water has been flowing through that fluid flow control device for a predetermined amount of time, such as 3 minutes or 5 minutes.

Figure 9:
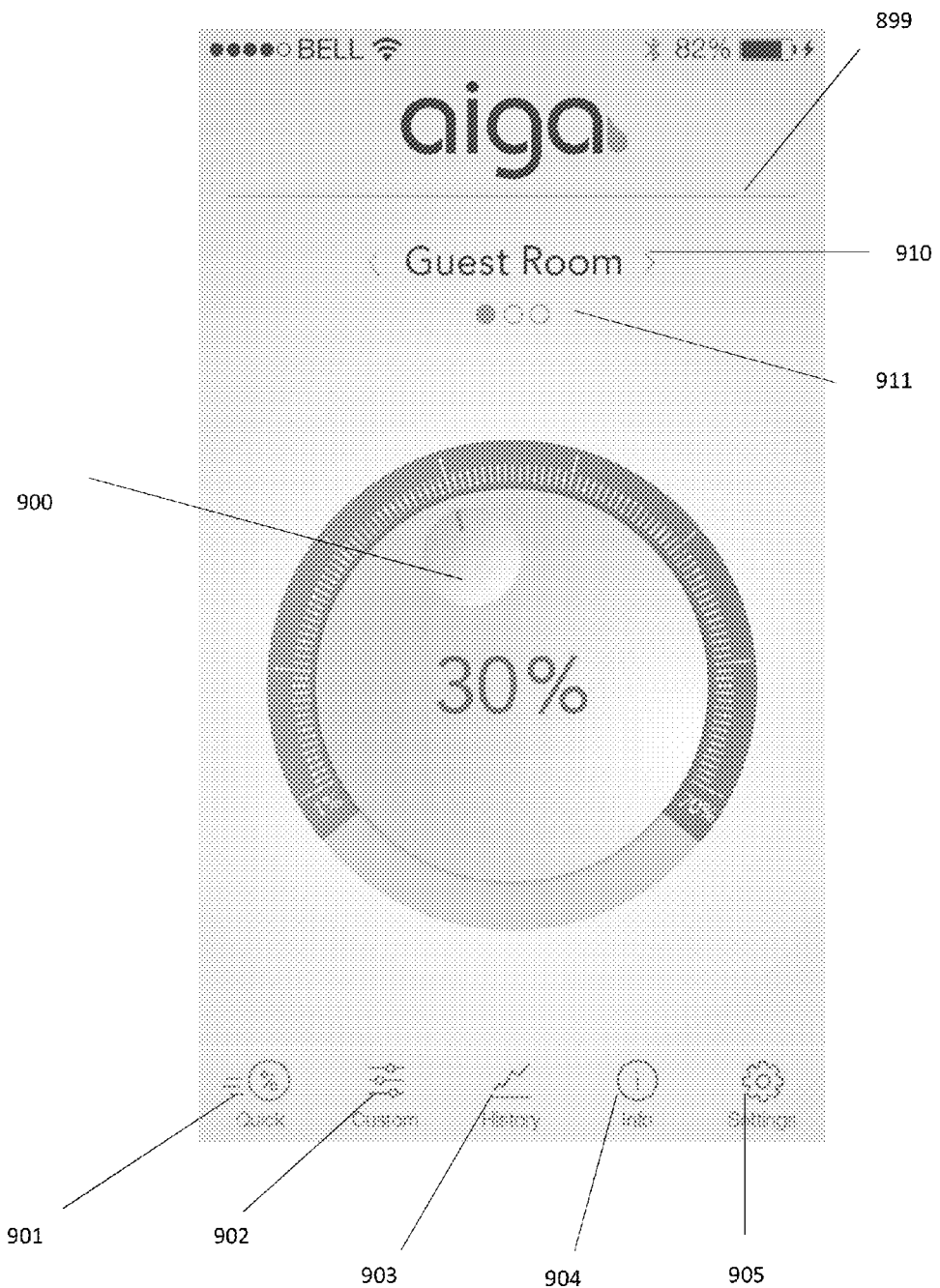
FIG. 9 is a screen capture of one embodiment of the device application that shows a quick setting.
Figure 10:
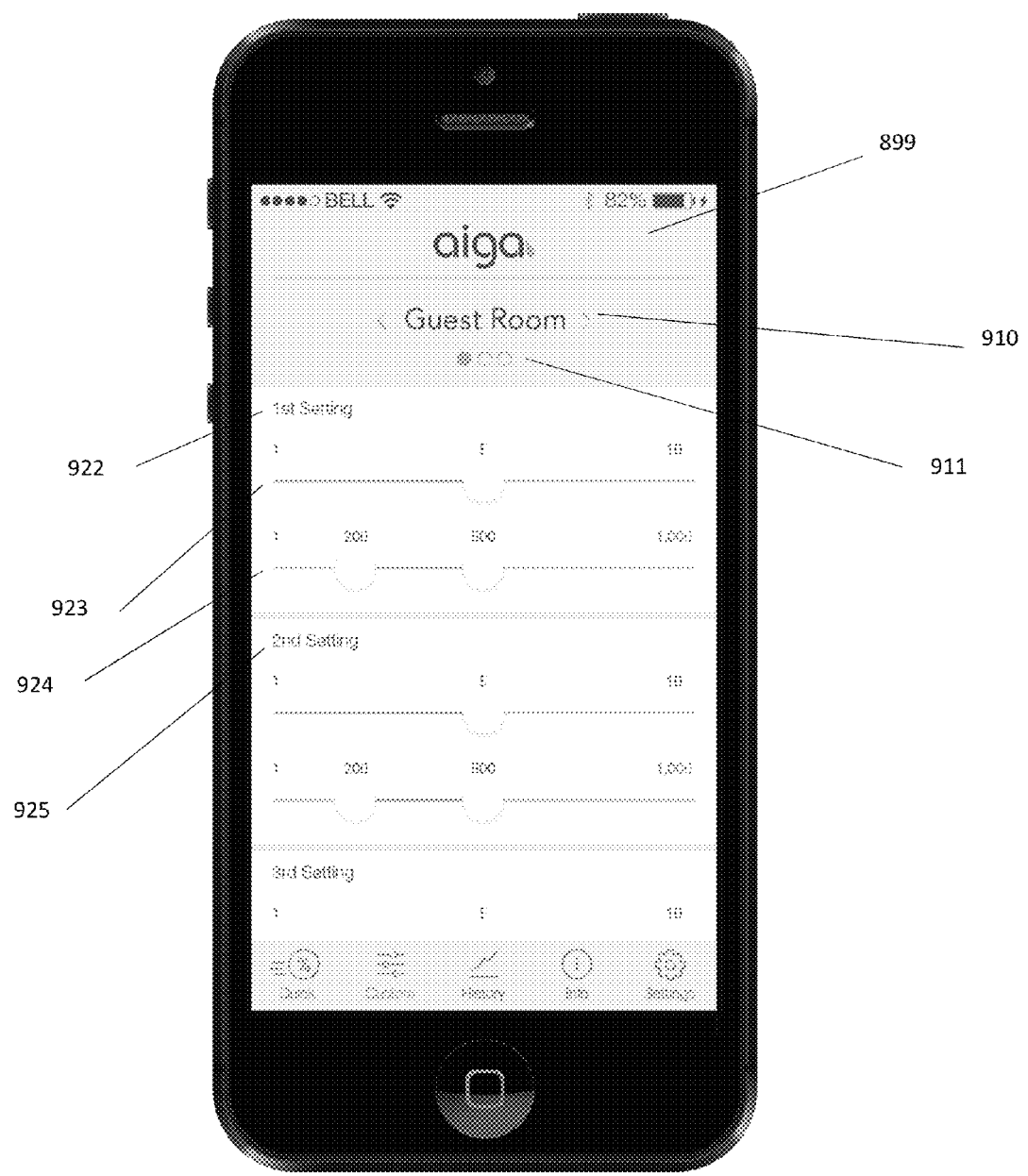
FIG. 10 is a screen capture of one embodiment of the device application that shows a custom setting.

The device application 520 preferably has a dynamic algorithm that learns and adapts so that the system can make automatic water optimization decisions in real-time based on fluid use profiles and water consumption targets, which may be based on seasonal factors. More information relating to the device application 520 is shown in FIGS. 9 and 10.

Figure 6:
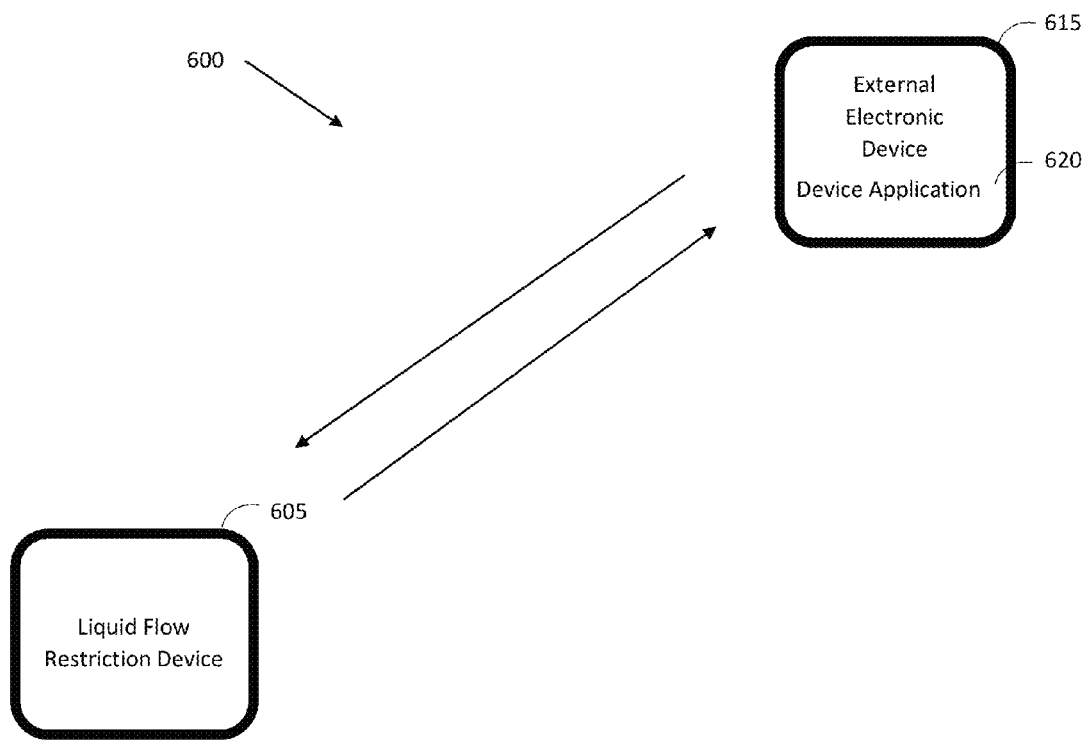
FIG. 6 is a diagram showing another embodiment of the system for optimizing water flow.

FIG. 6 is a diagram showing another embodiment of the system for optimizing water flow. As shown in FIG. 6, the system for optimizing water flow may comprise a fluid flow control device 605, external computing device 615, and device application 620. The fluid flow control device 605 may directly communicate wirelessly with the external computing device 615. The external computing device 615 may comprise a device application 620. The external computing device 615 may send a signal wirelessly to the fluid flow control device 605 to instruct the fluid flow control device 605 to reduce the flow of water.

Figure 7:
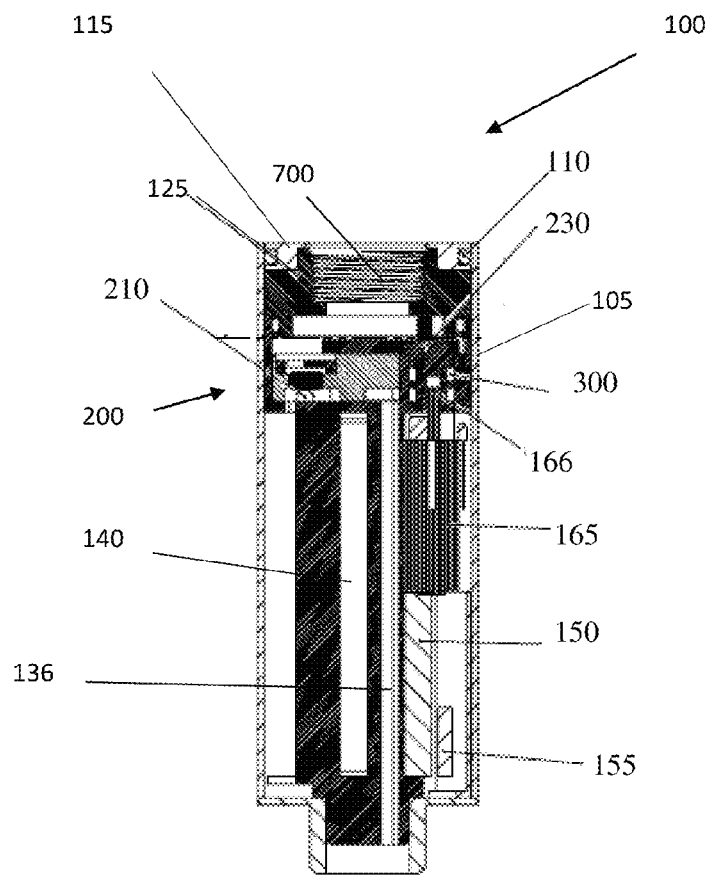
FIG. 7 is an illustration of a side cross-section view of one embodiment of the fluid flow controller.

FIG. 7 is an illustration of a side cross-section view of one embodiment of the fluid flow controller. As shown in FIG. 7, the fluid flow controller 100 may be a compact cylindrical device that is configured to fit between a water outlet and a showerhead and may comprise a shell 105, O-ring 110, cover 115, first adapter 125, which may comprise threads 700, fluid flow control component 200, pressure switch cover 210, fluid pathway 136, power source 140, wireless controller 150, motor drive 155, DC motor 165, motor shaft 166, and sensor apparatus 300.

Figure 8:
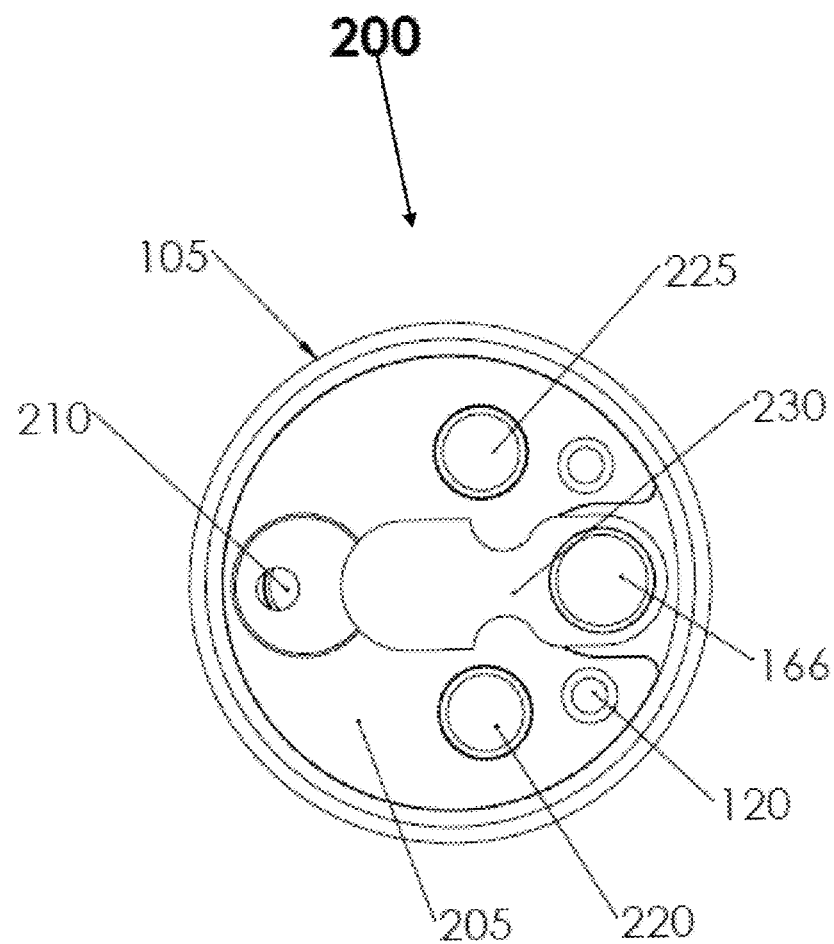
FIG. 8 is an illustration of a top view of one embodiment of the fluid flow controller.

FIG. 8 is an illustration of a top internal view of one embodiment of the fluid flow control component of one embodiment of the fluid flow controller. As shown in FIG. 8, the fluid flow control component 200 may be contained within cover 105, comprise a control adapter 205, pressure switch cover 210, first controller inlet 220, second controller inlet 225, and mechanical rheostat 230. The control adapter 205 may be configured to receive the various components of the fluid flow control component 200. The control adapter 205 may comprise several holes or grooves for receiving the first controller inlet 220, and second controller inlet 225. The pressure switch piston 215 may be received by a hole or groove in the control adapter 205 and be substantially covered and protected by the pressure switch cover 210, such that, the pressure switch 130 is able to determine when water is flowing and when water is not flowing through the fluid flow controller. The first controller 220 may be received by a hole or flow channel that traverses the height of the control adapter 205. Alternatively, a predetermined hole or flow channel in the control adapter 205 may function substantially the same as the first controller 220. The first controller 220 may be configured to allow a first flow rate of water to flow through the flow control component 200. The second controller 225 may be received by a hole or flow channel that traverses the height of the control adapter 205. Alternatively, a predetermined hole or flow channel in the control adapter 205 may function substantially the same as the second controller 225. The second controller 225 may be configured to allow a second flow rate of water to flow through the flow control component 200. The mechanical rheostat 230 may be mounted through the fluid flow control component 200 and be configured to couple with the motor shaft 166, and the DC motor 165 may adjust the position of the motor shaft 166 and therefore, also, the mechanical rheostat 230. FIG. 8 also shows screws 120.

FIG. 9 is screen capture of one embodiment of the device application 899 that shows a quick setting. As shown in FIG. 9, the user may directly set a water saving level by rotating the touch wheel 900. The dynamic algorithm that is part of the device application may then auto modulate one or more of the shower water outlets that are wirelessly linked to and controlled by the device application, such that the desired water savings are met during the course of any particular shower. FIG. 9 shows that the device application has numerous screens, including Quick 901, Custom 902, History 903, Info, 904, and Settings 905. FIG. 9 also shows how the quick setting screen may have a name 910 and may link to several different rooms 911, by swiping left and right.

FIG. 10 is screen capture of one embodiment of the device application 899 that shows a custom setting. As shown in FIG. 10, when the user selects the Custom 902 screen, the user may set specific flow patterns for certain time periods of the day for specific shower water outlets in specific rooms. In some embodiments, the device application 899 may include data entry screens for entering information, including, but not limited to, a budgeted amount of water usage for a month (or other time period). For example, a hotel owner may want to use 100,000 gallons for a particular month, across X number of showers. With this information, the dynamic algorithm of the device application changes the flow (daily, hourly, or by time of day) in order to meet the goal. In this manner the water usage of the hotel/facility can become more of a fixed cost that can be budgeted and controlled. FIG. 10 also shows that the device application 899 may have custom setting slide bars 923, 924, which may be part of several different custom settings 922, 925. The user may use the slide bars to set the custom settings.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A fluid flow controller device, comprising:
   a fluid flow controller;
   wherein said fluid flow controller comprises: a fluid flow control component and an electronic controller;
   wherein said fluid flow control component is configured to allow a fluid to pass through said fluid flow controller in at least two different flow rates;
   wherein said electronic controller controls said fluid flow controller component, such that said fluid flow controller component operatively switches between said at least two different flow rates;
   wherein said electronic controller is configured to wirelessly connect to an external computing device;
   wherein said electronic controller is configured to receive one or more signals from said external computing device related to selecting one of said at least two different flow rates;
   wherein said fluid flow controller further comprises a powered drive unit;

wherein said powered drive unit is operatively coupled with said fluid flow control component and said electronic controller;

wherein said electronic controller sends a signal to said powered drive unit, which in turn actuates said fluid flow control component;

wherein said electronic controller is configured to receive one or more signals from said external computing unit related to selecting one of said at least two different flow rates;

said at least two different flow rates are three different flow rates;

wherein said fluid flow control component comprises: a mechanical rheostat, a first control adapter, and a second control adapter;

wherein said mechanical rheostat is configured to operatively couple with a drive shaft of said powered drive unit; and wherein said mechanical rheostat has three positions: blocking said first control adapter; blocking said second control adapter; and not blocking either said first control adapter or said second control adapter.

2. The fluid flow controller device of claim 1, wherein, depending on which position said mechanical rheostat is in, said fluid flow controller is configured to allow said fluid to flow through said fluid flow controller in one of said three different flow rates.

3. The fluid flow controller device of claim 2, wherein said fluid flow controller further comprises one or more hall sensors;

wherein said one or more hall sensors are configured to determine a rotational position of said motor shaft.

4. The fluid flow controller device of claim 3, wherein said fluid flow controller further comprises at least one pressure switch; and wherein said at least one pressure switch is configured to determine whether said fluid is flowing through said fluid flow controller.

5. The fluid flow controller device of claim 4, wherein when said fluid is not flowing through said fluid flow controller, said electronic controller is not connected to a power supply.

6. The fluid flow controller device of claim 5, wherein a rotational position data from said one or more hall sensors and a flow data from said at least one pressure switch is communicated to said electronic controller.

7. The fluid flow controller device of claim 6, wherein said electronic controller communicates said rotational position data from said one or more hall sensors and said flow data from said at least one pressure switch to said external computing unit.

8. The fluid flow controller device of claim 7, wherein said three different flow rates are: 1.5 gallon per minute, 1 gallons per minute, and 2.5 gallons per minute.

9. A fluid flow control system, comprising:
a fluid flow controller; and
an external computing device
wherein said fluid flow controller comprises: a fluid flow control component and an electronic controller;
wherein said fluid flow control component is configured to allow a fluid to pass through said fluid flow controller in at least two different flow rates;
wherein said electronic controller controls said fluid flow controller component, such that said fluid flow controller component operatively switches between said at least two different flow rates;

wherein said electronic controller is configured to wirelessly connect to said external computing unit;

wherein said electronic controller is configured to receive one or more signals from said external computing unit related to selecting one of said at least two different flow rates;

wherein said fluid flow controller further comprises a powered drive unit;

wherein said powered drive unit is operatively coupled with said fluid flow control component and said electronic controller;

wherein said electronic controller sends a signal to said powered drive unit, which in turn actuates said fluid flow control component;

wherein said electronic controller is configured to receive one or more signals from said external computing unit related to selecting one of said at least two different flow rates;

wherein said at least two different flow rates are three different flow rates;

wherein said fluid flow control component comprises: a mechanical rheostat, a first control adapter, and a second control adapter;

wherein said mechanical rheostat is configured to operatively couple with a drive shaft of said powered drive unit;

wherein said mechanical rheostat has three positions: blocking said first control adapter; blocking said second control adapter; and not blocking either said first control adapter or said second control adapter; and wherein, depending on which position said mechanical rheostat is in, said fluid flow controller allows said fluid to flow through said fluid flow controller in one of said three different flow rates.

10. The fluid flow control device of claim 9, wherein said fluid flow controller further comprises one or more hall sensors and at least one pressure switch;

wherein said one or more hall sensors are configured to determine a rotational position of said motor shaft;

wherein said at least one pressure switch is configured to determine whether said fluid is flowing through said fluid flow controller;

wherein a rotational position data from said one or more hall sensors and a flow data from said at least one pressure switch is communicated to said electronic controller; and wherein said electronic controller communicates said rotational position data from said one or more hall sensors and said flow data from said at least one pressure switch to said external computing unit.

11. The fluid flow control system of claim 10, wherein said three different flow rates are: 1.5 gallon per minute, 1 gallons per minute, and 2.5 gallons per minute.

12. The fluid flow control system of claim 10, wherein said computing device comprises an application;

wherein said application receives and records a use data from said fluid flow controller;

wherein said application uses said use data to prepare one or more fluid use profiles; and wherein said application is configured to send commands to said fluid flow controller to adjust said flow of fluid through said fluid flow controller based on said one or more fluid use profiles.

13. The fluid flow control system of claim 10, wherein when said application determines that a set amount of said fluid has passed through said fluid flow controller, said application sends a signal to said fluid flow controller to lower the flow rate of said fluid passing through said fluid flow controller.

14. The fluid flow control system of claim 10, wherein when said application determines that said fluid has flowed through said fluid flow controller for a set amount of time, said application sends a signal to said fluid flow controller to lower the flow rate of said fluid passing through said fluid flow controller.

* * * * *